June 24, 1930.  L. GOLDHAMMER  1,768,315
OBJECTIVE SHUTTER CASING
Filed Jan. 22, 1929
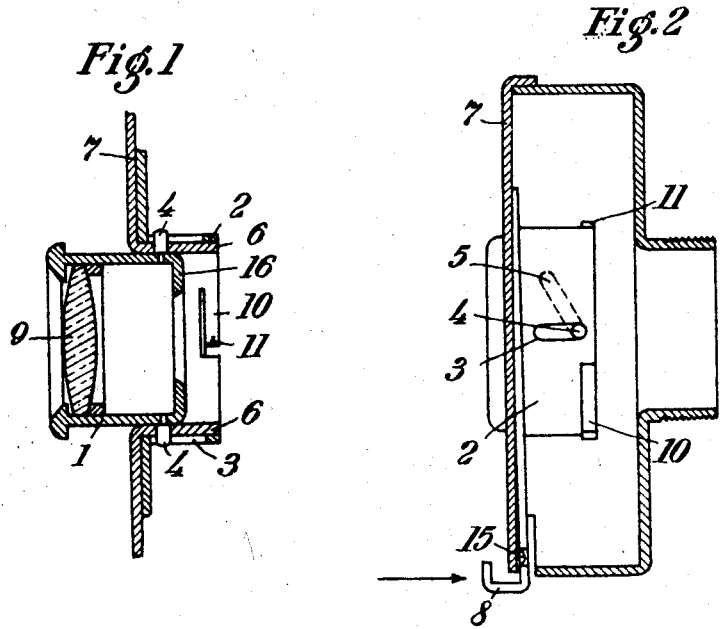
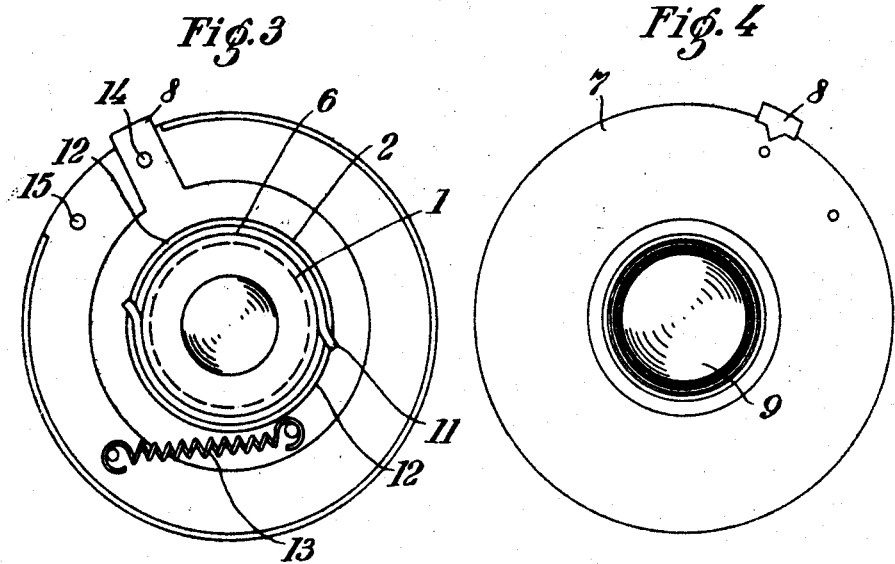
Leo Goldhammer, Inventor,
By Philip S. Hopkins,
Attorney.

Patented June 24, 1930

1,768,315

UNITED STATES PATENT OFFICE

LEO GOLDHAMMER, OF MUNICH, GERMANY, ASSIGNOR TO AGFA ANSCO CORPORATION, OF BINGHAMTON, NEW YORK, A CORPORATION OF NEW YORK

OBJECTIVE-SHUTTER CASING

Application filed January 22, 1929; Serial No. 334,280, and in Germany January 18, 1928.

The present invention relates to an objective-shutter casing for photographic cameras more particularly to a shuttter casing in which the tube carrying the lens is movable in the casing both axially and rotarily.

In a known construction the lens is fixed in the shutter casing and the latter is moved by means of a mechanical device, such as a slot and pin connection like that herein shown. This known construction requires the use of somewhat large dimensions and thick material; moreover, the assembly and more particularly the dismounting of the parts of such a casing present difficulties, and the cost of manufacture is considerably enhanced.

My present invention provides a simple, cheap and practical form of construction, whereby the lens is accommodated in the shutter casing in such a manner that it can be adjusted for focusing purposes. The shutter casing is fixed while the lens is mounted so as to move in the casing. Movement of the lens for focusing purposes is caused by rotation of a supplementary tube mounted to rotate relatively to a fixed tube in the casing; for this purpose the tubes are provided with relatively inclined slots, and a pin mounted on the lens carrier is engaged by both slots, whereby the relative motion of the slots produced by rotation of the movable tube causes the lens carrier to move in the axial direction of the lens. In the preferred construction the slot of the rotatable tube is parallel to the axis of the lens and that of the fixed tube is diagonally arranged. This slot and pin device can be considerably smaller than in the known construction in which the whole shutter casing is moved for focusing purposes, since it is relieved from the weight of the casing. Moreover, the construction may be such that after the photograph of near objects has been taken, the lens is automatically returned into the normal position. This latter movement may be produced by a spring which in response to light pressure on a knob is released and returns the lens into its initial position. Other adjustments than "near" and "far" are not provided in short focus lenses of low relative aperture. By another feature of my present invention the central opening of the front plate of the shutter casing is made with an inwardly projecting cylindrical flange which forms a tubular guide for the lens tube. This tubular flange may be bent at its inner end to engage the aforesaid supplementary tube so as to prevent axial movement of the latter. The tube which carries the lens may be bent inwards at its inner end so as to form a small circular opening or an aperture diaphragm for the purpose of stopping the marginal pencils of the light. The aforesaid devices simplify, cheapen and reduce the size of the shutter casing and permit of easy assembly and dismounting.

In the accompanying drawings there is shown an example of the invention, Fig. 1 being a part section through the shutter casing, Fig. 2 an axial section through the shutter casing, Fig. 3 a rear view, the back of the casing having been removed and Fig. 4 a front view.

The lens tube 1 is moved axially by rotation of the outer tube 2, owing to the engagement of the pins 4, which it carries in slots 3 in the tube 2 parallel to the axis, thereof and in diagonal slots 5 in the fixed tube 6, so that the rotary movement of the tube 2 is translated into an axial movement of tube 1. The lens tube 1 is bent inwards at its inner end to form a stop 16 for the marginal pencils of the light. The tube 6 is in one piece with the front plate 7 of the shutter casing and serves as a guide for the two other tubes. The tube 2 is turned by means of an index pointer 8, whereby the lens is focused in the manner described. The rear end of the tube 6 is cut to form springs 10, the ends 11 of which are bent outwards and engage in notches 12 in the tube 2, whereby the latter is prevented from axial movement. This arrangement particularly facilitates the assembly and taking apart of the device.

In order to obtain an automatic return of the lens to its innermost position in the shutter casing the invention provides a spring 13, which is put in tension by the focusing movement of the tube 2 and subsequently returns the tube 1 into its original position. In the focused position the spring is held under tension by a catch, such as a cavity 14 in the index pointer 8, cooperating with a boss 15 on the front plate 7. Release of the catch 14 or 15 can be effected by hand or automatically by pressure on the index pointer 8 of some part of the camera when the latter is folded.

I claim:

1. A fixed objective shutter casing for photographic cameras comprising a fixed guiding tube and a lens carrying tube axially and rotarily movable in the shutter casing.

2. In a fixed objective shutter casing for photographic cameras, a fixed guiding tube, a lens carrying tube axially movable in the shutter casing, and a rotatable tube engaging the guiding tube and the lens carrying tube by a pin and slot connection, the rotatable tube being prevented from axial movement by engagement with a fixed part of the shutter casing.

3. In a fixed objective shutter casing for photographic cameras, a fixed guiding tube, a lens carrying tube axially movable in the shutter casing, a rotatable tube engaging the guiding tube and the lens carrying tube by a pin and slot connection, the rotatable tube being prevented from axial movement by engagement with a fixed part of the shutter casing, a spring, tensioned by the focusing movement and a catch retaining the objective in the "near" focusing position, the spring, when released returning the objective automatically to its initial position.

4. In a fixed objective shutter casing for photographic cameras a fixed guiding tube, a lens carrying tube bent inwardly at its inner end to form an aperture diaphragm and axially movable in the shutter casing, and a rotatable tube engaging the guiding tube and the lens carrying tube by a pin and slot connection, the rotatable tube being prevented from axial movement by engagement with a fixed part of the shutter casing.

5. In a fixed objective shutter casing for photographic cameras, a fixed guiding tube, a lens carrying tube axially movable in the shutter casing, a rotatable tube engaging the guiding tube and the lens carrying tube by a pin and slot connection, the rotatable tube being prevented from axial movement by engagement with a fixed part of the shutter casing, a spring tensioned by the focusing movement and a catch retaining the objective in the "near" focusing position, and means to release the spring by action of a part of the camera not in direct connection with the shutter casing, whereby the objective is automatically returned to its initial position.

6. In a fixed objective shutter casing for photographic cameras a fixed guiding tube, a lens carrying tube bent inwardly at its inner end to form an aperture diaphragm and axially movable in the shutter casing, a rotatable tube engaging the guiding tube and the lens carrying tube by a pin and slot connection, the rotatable tube being prevented from axial movement by engagement with a fixed part of the shutter casing, a spring tensioned by the focusing movement and a catch retaining the objective in the "near" focusing position, the spring, when released returning the objective automatically to its initial position.

7. In a fixed objective shutter casing for photographic cameras a fixed guiding tube, a lens carrying tube bent inwardly at its inner end to form an aperture diaphragm and axially movable in the shutter casing, a rotatable tube engaging the guiding tube and the lens carrying tube by a pin and slot connection, the rotatable tube being prevented from axial movement by engagement with a fixed part of the shutter casing a spring tensioned by the focusing movement, a catch retaining the objective in the "near" focusing position and means to release the spring by action of a part of the camera not in direct connection with the shutter casing whereby the objective is automatically returned to its initial position.

In testimony whereof, I affix my signature.

LEO GOLDHAMMER.